April 19, 1960 R. G. KURTZ 2,933,151
CLEANING AND TREATMENT OF GASES
Filed March 21, 1957 2 Sheets-Sheet 1

INVENTOR.
ROBERT G. KURTZ
BY
AGENT

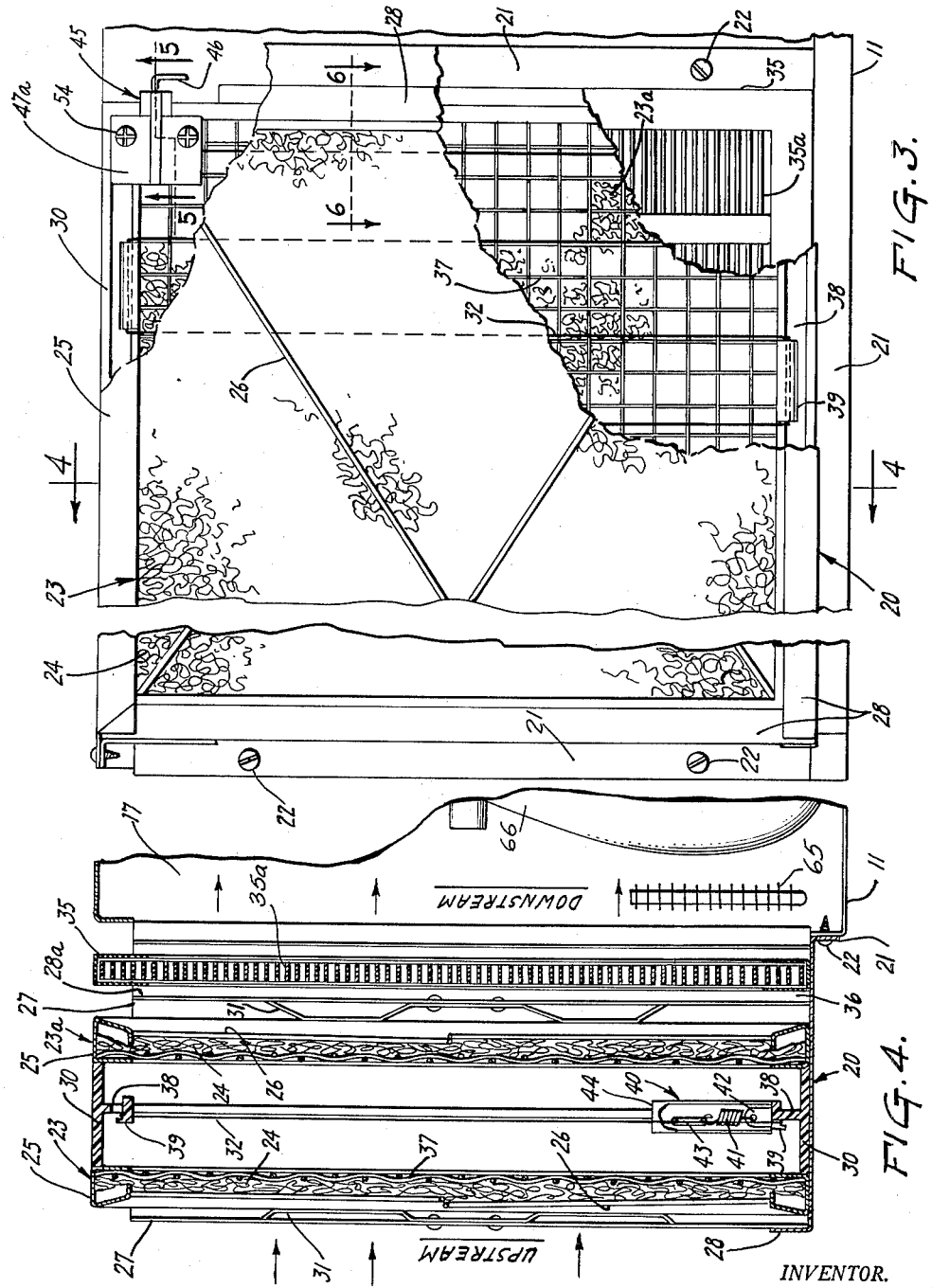

United States Patent Office 2,933,151
Patented Apr. 19, 1960

2,933,151

CLEANING AND TREATMENT OF GASES

Robert G. Kurtz, Philadelphia, Pa., assignor to Philco Corporation, Philadelphia, Pa., a corporation of Pennsylvania Application March 21, 1957, Serial No. 647,540

5 Claims. (Cl. 183—7)

This invention relates to the treatment of gases, and has as its broader objective the removal of foreign particles from such gases, and maintenance of a predetermined ion level or concentration in such gases.

More particularly, it is an object of the invention to control ionization of the atmosphere, in a habitable enclosure, in such manner as to benefit the health and sense of well being of persons within the enclosure. The concepts of the invention are of special utility in the field of air conditioning and, accordingly, the following detailed description and the accompanying drawings describe and illustrate the invention in a room air conditioner.

It has been known in the past to use air filtering means, and also known that the net ion charge in a habitable atmosphere has a psychological and physiological effect upon humans; if this net charge be, for example, negative, the effects as described are beneficial. Thus far, however, the discharge of ions into a habitable atmosphere has been carried out by apparatus devised solely and specially for that purpose.

In particular accord with the present invention, however, it is contemplated that filtering means, of the type comprising an appropriately designed electrostatic precipitator, may also provide this desirable ion content of the atmosphere. Recognition of this principle comprises the central concept of my invention and is of substantial significance.

In the field of air conditioning, equipment for maintaining an atmosphere relatively free of foreign particles under optimum desired conditions of temperature and humidity has reached a high degree of development; for example most prior art electrostatic filter arrangements have utilized extended collection paths, this being done to promote collection efficiency and to insure that deposition of the dust and dirt will be limited to a desired predetermined area. However, there has been no recognition of the fact that if the precipitating equipment be properly designed and operated above the ionizing potential, it is also possible to alter or control the ion level or concentration within the conditioned area.

It is an important object of this invention to provide a method of and apparatus for conditioning air, practice of which method and the utilization of which apparatus makes it possible fully to achieve the advantages of air ionization while at the same time substantially removing the foreign particles from the air. To these general ends the invention contemplates the production of atmospheric ions in an electrostatic precipitating device and collecting substantially less than all of the ions, including the ionized particulate matter, on any single pass through the collector electrode or filter, whereby to create an ionized atmosphere within the enclosure being air-conditioned. Specifically it is an object of my invention to make use of an inherently inefficient collecting electrode, for example an electrode comprising a relatively short collector path, in such manner as to derive a beneficial by-product, that is, an excess of atmospheric ions in the enclosure under treatment.

In accordance with an important feature of the invention, electrical discharge means is provided to produce the atmospheric ions within an electrostatic precipitator disposed in an air conditioner. Suitably disposed with respect to the discharging electrodes are grounded, flat, sheet-type impingement filters which constitute a relatively inefficient collecting means for the charged particulate matter or atmospheric ions flowing therethrough, whereby less than all of the ions are collected upon a single pass through the filter and the excess of atmospheric ions and charged particles are released by the precipitator for discharge into the air of the room.

Reference has been made above, and will be made hereinafter to "ions," to "charged" particulate matter, and to "atmospheric ions." Within the teaching of this invention these terms contemplate ions which may be either gaseous components of the atmosphere, for example oxygen, nitrogen, and water vapor, or particulate components such as dust particles or other air contaminants. The appended claims should be understood with this in mind. Also there should be recognition of the fact that emphasis hereinafter on a negatively ionized atmosphere is not intended to exclude possible practice of the invention to achieve a positively ionized atmosphere, or even the possibility that some ions of one sign may be present in an atmosphere which is predominantly of the other polarity.

The manner in which the foregoing and other objectives of the invention may best be achieved will be more clearly understood from a consideration of the following description, taken in conjunction with the accompanying drawings, in which:

Figure 3 is a somewhat enlarged fragmentary view, in front elevation, of a portion of the apparatus shown in Figure 2;

Figure 4 is a sectional view, in side elevation, taken along line 4—4 of Figure 3;

Figure 1:
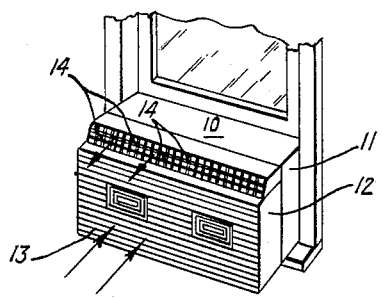
Figure 1 is a perspective showing of a window mounted room air conditioner made in accordance with a preferred embodiment of this invention.
Figure 2:
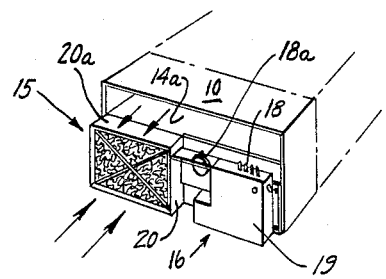
Figure 2 is a view similar to Figure 1, but showing a portion of the housing structure removed.

Now making more detailed reference to the drawings, and more particularly to Figure 1 there is shown a conventional window mounted air conditioner 10 including a cabinet 11 and a conventional decorative panel 12. Further included in the decorative panel are the inlet and outlet air passages, or grilles, 13 and 14, respectively, each being in air flow communication with the usual refrigerating and air moving means housed within the air conditioner cabinet and including (Figure 4) an evaporator coil 65 and a fan 66. Shown in Figure 2 is air conditioner 10 with decorative panel 12 removed to expose the novel electrostatic filtering and ionizing means 15 with which this invention is concerned. Preferably, and in accordance with this preferred embodiment, the construction and arrangement of filter 15 is such that it is disposed intermediate the inlet grille 13 and the inlet air duct 17 (Figures 4 and 6) of the air conditioner. There is also shown in Figure 2 suitable electrical component structure or "pack" 16, including cycle controls, indicated at 18 and 18a as well as ionizing voltage supply means 19.

Now referring again to Figure 2 there is shown filtering and ionizing means 15, including a sleeve-like housing 20 provided with a suitable detachable cover 20a. As best seen in Figure 4, cover 20a has been removed thereby providing access to the filter elements, as will be hereinafter more fully described. Attachment of filtering means to the air conditioner may be made by any suitable means, however a preferred embodiment contemplates the simple expedient of attaching housing 20 by screws 22 passing through flanges 21 thereof and into the air conditioning cabinet 11; thus there is provided a unitary filtering and ionizing structure adapted for convenient assembly, as well as replacement should the need arise. More particularly (Figures 4 and 6) there appear upstream and downstream impingement-type filters or collector electrodes 23 and 23a, preferably of metal construction and including coatings of viscous material (not shown). A filter found suitable for the present purposes, and which is available commercially, comprises a filter medium 24 of several layers of expanded aluminum sheet supported within an aluminum frame 25. Serving further to rigidify the frame 25 are diagonal cross members 26, which are attached at the corners of the frame by known suitable means. Retaining means for filters 23 and 23a include guide channel 27, comprising housing 20, flange portions 28 and 28a thereof (Figure 6), and edges 29 of frame 30, said channel being adapted slidably to receive the filters for removal and insertion thereof. Associated with the channels 27 are resilient members 31 (Figure 6) adapted to exert force upon frames 25 and urge the latter against edge members 29, thereby retaining the filters, enhancing electrical contact of the filter media with the aforesaid channels, and maintaining equal spacing of an ionizing electrode or wire 32 disposed intermediate the upstream and downstream filters.

As best seen in Figures 3 and 4, electrode 32 is supported by the frame 30—which is of electrically non-conductive material—in a serpentine manner, in vertically extending, parallelly disposed spans lying substantially in a plane extending transverse the direction of air flow. Construction and arrangement of this frame with respect to housing 20 permits ready removal or insertion of the frame, through slidable engagement between members 33, as seen in Figure 6, which are affixed to the housing, and a web 34 formed in the frame.

Immediately downstream of the second metal filter 23a is a charcoal filter 35 adapted for slidable insertion in or removal from channels 36, much in the manner of filters 23 and 23a. This charcoal filter may be of several commercially available types, the one illustrated comprising horizontally disposed, spaced ribbon-like elements 35a of activated carbon lying parallel to one another, each substantially in the plane of air flow, and extending across the air stream.

Insertion and removal of the foregoing elements is accomplished through the hereinbefore mentioned top access opening provided in housing 20, as best seen in Figure 4 with the cover 20a removed.

Figure 6:
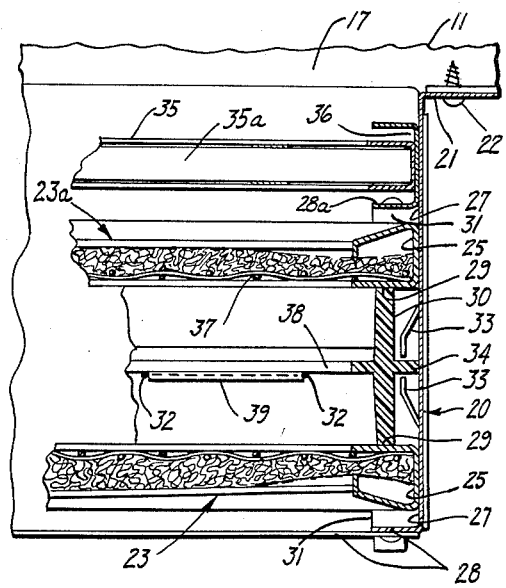
Figure 6 is a horizontal section, on a somewhat enlarged scale, taken along the line 6—6 of Figure 3.

Also, as shown in Figures 3, 4 and 6, affixed to the inner faces of the filters 23 and 23a are sheets of wire screen 37 commonly known as "hardware cloth," which insure proper spacing of the filter media 24 from the ionizing wire 32, inasmuch as metallic filter media of this type is sometimes flexible and movement thereof may upset the substantially critical spacing between the ionizing wire and the collector electrode.

Structural features of the ionizing wire frame 30 are best seen in Figures 3, 4, and 6 wherein there are shown, formed integrally with web sections 38 of the frame 30, a plurality of horizontally disposed L-shaped channel elements 39 over which the wire 32 is strung. Opposing elements 39 are staggered with respect to one another (see Figure 3) whereby the serpentine configuration of wire 32 is accommodated. Seen in Figure 4 is tensioning means 40 comprising spring 41 affixed at its one end to a suitably formed portion 42 of web 38, and at its other end to clamping means 43 affixed to wire 32. Enclosing the tensioning means 40 is a sleeve-like member 44 of electrical insulating material. Tensioning means 40 will advantageously compensate for variations in the length of wire 32 and therefore aid in maintaining proper spacing of the wire from the collector electrodes 23 and 23a by preventing undue sagging of the wire. Figure 3 further shows a disconnect terminal means 45 for ionizing wire 32 to which lead wire 46 (Figures 3 and 7) from the power supply unit 19 is affixed.

Figure 5:
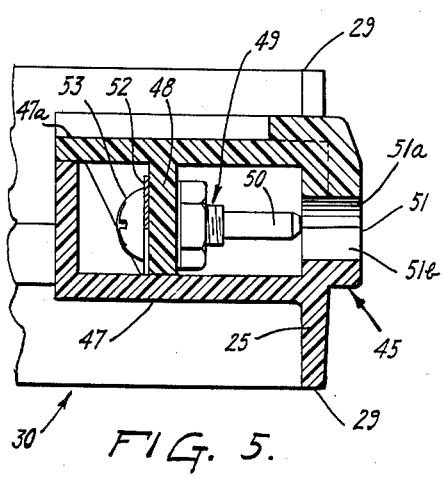
Figure 5 is a horizontal section, on a somewhat enlarged scale, taken along the line 5—5 of Figure 3.

Terminal means 45, as seen in Figure 5, includes a box-like housing 47 formed within frame 30, and a vertically extending web member 48, said member 48 being formed integrally with wall portion 47a for reasons hereinafter more fully explained. Extending through the web and supported therein are nut and bolt means 49, the bolt having a non-threaded portion 50 adapted to receive a disconnect type terminal (not shown) secured to the lead 46. Concentric with means 49 is a cylindrical aperture 51 comprising portion 51a formed integrally with wall portion 47a and portion 51b formed integrally with frame 30, and through which the aforementioned lead is insertable. Attachment of wire 32 to terminal means 45 is made by affixing to the end of the wire a washer 52, the latter being inserted between bolt head 53 and web member 48. As best seen in Figures 3 and 5, a wall portion 47a of housing 47 is detachable, including portion 51a of aperture 51, as by screws 54, thereby providing for removal of the terminal, for access thereto, in case of need to replace the wire 32.

Figure 7:
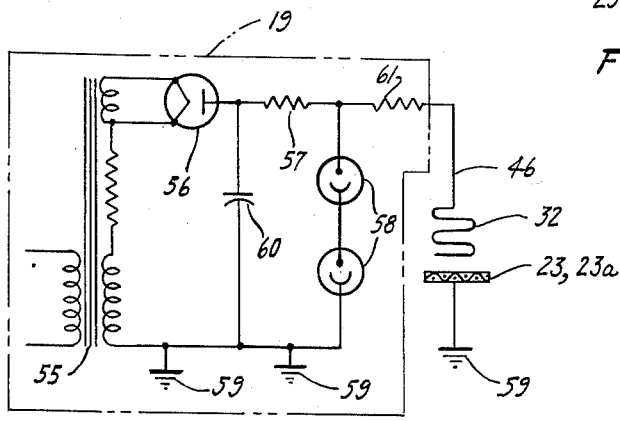
Figure 7 is a schematic showing of electrical circuitry used in apparatus embodying the invention.

There is seen in Figure 7 a schematic diagram of suitable electrical circuitry for producing the desired electrostatic field. Transformer 55, the primary winding of which may be supplied with electrical power from a suitable source, supplies a voltage in the neighborhood of about 6000 volts to a half-wave rectifier tube 56, about the same D.C. voltage being produced between ionizing electrode 32 and ground electrodes 23 and 23a. This voltage is maintained substantially constant by resistor 57 and corona discharge tubes 58, and condenser 60 provides means for maintaining peak voltage supplied by the rectifier tube 56. Ground terminals 59 may be provided by bringing housing 20 into electrical contact with filters 23 and 23a. A resistor 61 is also provided, as shown, to control the current through the electrodes 32 and 23, preferably limiting the current to a value of about 10 microamperes.

The following dimensions are representative of a preferred embodiment of the invention, and are characteristic of apparatus, which yields very satisfactory results:

Filters 23 and 23a—9¼" x 12 15/16" x ½".

Ionizing wire—11 passes of 5 mil tungsten wire spaced 1⅛" apart.

Distance between ionizing wire and the metal filters (collectors)—⅝".

In preferred operation of the novel combined filter and ion generator a negative potential is applied to the ionizing wire 32 whereupon electrostatic fields are set up between the ionizing wire and the grounded upstream and downstream filters, or electrodes, 23 and 23a. Dust-laden air first is drawn into grille 13 by fan 66 and passes through the upstream aluminum filter 23. Gaseous components of the air as well as the entrained particulate matter are charged as the air passes through the aforesaid electrostatic fields, the net charge applied being negative, and therefore the negatively ionized impurities in the air adhere to the second, or downstream, aluminum filter as well as to the first, or upstream, filter. The particle holding qualities of the filters are improved by applying a coating of viscous material to mesh 24 of the filter, as hereinbefore described.

Following removal of certain of the impurities by passage through the filters, the cleaned and ionized air flows through the activated charcoal filter 35 adapted to absorb any odors, and from there the aforementioned air passes through duct 17, across the cooling means, then through discharge duct means 14a and grilles 14 back into the room. In accordance with the novel principles of the invention the aforementioned aluminum filters are inherently of relatively low collection efficiency, presenting, in this preferred embodiment, a relatively shallow collection area with respect to the direction of air flow, and therefore ensuring that a substantial percentage of the uncollected negatively charged components pass into the room area, thereby increasing the negative ion content of the enclosure being conditioned.

It is to be understood of course that while substantially less than all of the ionized components are collected on any single "pass" through the filtering device, repeated passes result in a high order of cleaning of the air while yet ensuring the maintenance of the desired ion concentration in the enclosure. Also, it will be recognized that the polarity of the ionizing wire may be controlled to produce positive or negative ions, as desired.

From the foregoing description both the apparatus and the operational aspects of my invention will be understood. However some additional consideration of certain tests which have been made, will be helpful in establishing the nature and extent of the results which can be achieved. The following tests were conducted for the purpose of determining and recording the gains or relief from air-borne allergies through air ionization and the tests demonstrate the presence and advantages of ionization of the air. The apparatus can of course be used to maintain a positively ionized atmosphere, when that is desired.

A total of three rooms were equipped with electrostatic ionizing means and a monitoring device whereby accurate and continuous recordings of ion levels were provided.

These tests were made to establish the importance of unipolar (in this case negative) ionization of the air within an inhabited enclosure, and also to determine the limits of ion concentration within which certain beneficial results are achieved. The tests were conducted by applicant's assignee corporation, in concert with qualified medical personnel, and the beneficial results achieved have received wide attention in medical and technical circles. When suitable ion levels were established by the tests, the apparatus disclosed and claimed herein was designed to operate within the limits thus determined and to accomplish the air cleaning purposes as well as to treat the air to obtain the benefits established by the tests.

Provision was made in the aforesaid tests, to ionize the rooms positively and negatively, or to leave them at natural levels for control purposes. To insure an impartial and objective evaluation, the polarity and concentration of the ionization used was known only to the engineer in charge of ion generation and metering, and records to this effect were kept sealed until the end of the test program. At the end of the program the medical records and results were matched day-by-day and hour-by-hour with the aforesaid ionization data.

Each room was monitored for ion counts before each series of tests and before the patients were present. These counts were made at various seating positions, and a continuous record was also maintained of ion levels in a fixed position during the test.

Under the foregoing arrangement patients were selectively subjected to control (natural conditions) and to atmospheres of either positive or negative polarity, with concentrations up to 7500 ions per cubic centimeter. Actual exposures to negative ionization were made at concentrations ranging from 850 to 7500 ions per cubic centimeter, and positive ionization tests were made at concentrations ranging from 2000 to 7500 ions per cubic centimeter. Control tests were conducted under conditions resembling outside air with positive and negative ionization ranging from 400 to 600 ions per cubic centimeter.

In order to prevent fatigue of the test subjects during exposures of 20 to 30 minutes duration, chairs within each room were comfortably arranged around a table provided with reading material. As a result, symptoms due to nervousness or anxiety were minimized. A large number of hay-fever patients were made available for the test program, and symptoms of these patients ranged all the way from mild, or no symptoms, to very acute conditions.

A waiting period and a careful medical examination preceded the exposure of the patients to a controlled ionized atmosphere. This waiting period, which was dependent upon the number of patients involved, was 30 minutes to one hour. Since this period was spent in a waiting room under natural conditions without air conditioning, it served as a preliminary control before the examination. A total of four examinations and interviews were had with each patient throughout the course of the clinical procedure, and these examinations and interviews were timed to permit a comprehensive and complete record of any change in symptoms developed by the patient during the waiting period and during the period of exposure to ionized atmosphere. However, the clinical procedure was such that the patient had no knowledge that any treatment was involved.

The foregoing tests revealed the following:

A. A total of 53 patients having symptoms of hay-fever were treated with negative ionization. Of these 33, or 52.2% received partial to complete relief. Patients in this group with very severe symptoms numbered 19, 11 of which obtained marked relief. Of this group of 19, seven became free of all symptoms and one did not respond to ionization.

B. Some patients did not manifest any acute symptoms at the time of the examination, and 37 of these were subjected to negative ionization for periods up to 40 minutes, and no adverse effects were observed.

C. Of special significance were results obtained with positive ionization. Positive ions not only failed to produce any measure of relief, but in many instances actually caused increased irritation and discomfort.

D. To insure that ionization of the room was the only factor present in the tests that affected symptoms, 13 patients with acute symptoms were subjected to clinical procedures with no artificial ionization in the treatment room. Eleven of these patients experienced no relief, one became worse, and one had partial relief.

From the foregoing description, as well as from consideration of the above described tests it will be clear that the method and apparatus concepts of this invention constitute a significant contribution in the air conditioning field. It is particularly to be noted that the present invention makes it possible to control ionization of the atmosphere of a habitable enclosure to benefit the health and sense of well being of persons in the enclosure while at the same time cleaning and filtering the air.

While this description and the accompanying drawings are illustrative of the invention in a single preferred embodiment, it will be recognized that changes and modifications may be made in the described apparatus and techniques, without departing from the spirit of the invention as defined in the appended claims.

I claim:

1. Air conditioning apparatus for cooling and cleaning air and for producing substantially unipolar negative ionization of the atmosphere within a habitable enclosure to benefit the health and sense of well being of persons within the enclosure, comprising: means for circulating cooled air within said enclosure; electrically non-conductive frame means positioned across the circulating air stream; discharge grid means carried by said frame means and extending between oppositely disposed sides thereof, said grid means including wire portions spaced one from the other in the direction transverse said circulating air stream; an electrically conductive filter screen, resiliently urged against said frame means and extending transverse the path of the circulating airstream, said frame means providing the spacing between said filter screen and said discharge grid means; and means for applying a D.C. potential across said filter screen and said grid means to establish a combined particle ionizing and precipitating field between said grid means and said filter means.

2. Air conditioning apparatus for cooling and cleaning air and for producing substantially unipolar negative ionization of the atmosphere within a habitable enclosure to benefit the health and sense of well being of persons within the enclosure, comprising; means for circulating cooled air within said enclosure; electrically non-conductive frame means positioned across the circulating air stream; discharge grid means carried by said frame means and extending between oppositely disposed sides thereof, said grid means including a single wire having portions spaced one from the other in the direction transverse said circulating air stream; an electrically conductive filter screen disposed adjacent said frame means and engaging the latter while extending transverse the path of the circulating air stream, said frame means providing the spacing between said filter screen and said discharge grid means; and means for applying a D.C. potential between said filter screen and said grid means to establish a combined ionizing and precipitating field between said grid means and said filter screen.

3. Air conditioning apparatus for cooling and cleaning air and for producing substantially unipolar negative ionization of the atmosphere within a habitable enclosure to benefit the health and sense of well being of persons within the enclosure, comprising: duct means providing for passage of air to be conditioned; means for circulating air through said duct means; electrically non-conductive frame means having framing portions closely engaging interiorly disposed portions of said duct means and extending across the latter; discharge grid means carried by said frame and extending between oppositely disposed sides thereof and in the direction transverse said duct means; electrically conductive filter screens disposed adjacent upstream and downstream edge portions of said framing portions and extending across said air duct means, said framing portions providing the spacing between said filter screens and between each said filter screen and said discharge grid means; and means for applying a D.C. potential between said filter screens and said grid means to establish combined particle ionizing and precipitating fields between said grid means and each said filter screen.

4. Apparatus in accordance with claim 3, and further characterized in that said duct means is substantially rectangular in cross-section and said frame means includes inwardly presented web portions extending substantially in the plane thereof and along oppositely disposed framing portions thereof, and a second set of outwardly presented web portions extending along the other oppositely disposed framing portions of the frame means and toward oppositely disposed walls of said duct means, said duct means having groove means receiving said outwardly presented web portions to maintain the position of said frame means, said single wire of said grid means extending between and supported by said inwardly presented rib portions.

5. Apparatus for cleaning air and for producing substantially unipolar ionization of the atmosphere within a habitable enclosure, comprising: means for circulating air within said enclosure; electrically non-conductive frame means positioned across the path of circulating air; a single, electrically conductive wire including spaced loop portions extending between oppositely disposed portions of said frame means in position to be in the path of the circulating air; a pair of electrically conductive filter screens, each disposed adjacent said frame means and extending transverse the path of the circulating air, said frame means providing the spacing between said filter screens and said electrically conductive wire; and means for applying a D.-C. potential between said conductive wire and said screens to establish a combined particle ionizing and precipitating field between said wire and each said filter screen.

References Cited in the file of this patent

UNITED STATES PATENTS

| 2,043,217 | Yaglou | June 2, 1936 |
| 2,610,699 | Penney et al. | Sept. 16, 1952 |
| 2,786,544 | Conner | Mar. 16, 1957 |

FOREIGN PATENTS

| 435,574 | Germany | Mar. 11, 1927 |
| 420,360 | Great Britain | Nov. 20, 1934 |
| 816,463 | France | May 3, 1937 |

OTHER REFERENCES

"Electrically Charged Dust in Rooms," by Penney and Hewitt, Trans. American Inst., Electrical Engineers, vol. 68, pages 278–282, 1949.